(12) United States Patent  
Genoni

(10) Patent No.: US 9,316,336 B2  
(45) Date of Patent: Apr. 19, 2016

(54) PENETRATION FITTING UNIT FOR SEAL-CONNECTION BETWEEN A WALL AND A PIPE PASSING THROUGH

(71) Applicant: NUPIGECO S.p.A., Busto Arsizio (VA) (IT)

(72) Inventor: Marco Genoni, Arese (IT)

(73) Assignee: NUPI INDUSTRIE ITALIANE S.P.A., Busto Arsizio (VA) (IT)

( * ) Notice: Subject to any disclaimer, the term of this patent is extended or adjusted under 35 U.S.C. 154(b) by 358 days.

(21) Appl. No.: 13/630,389

(22) Filed: Sep. 28, 2012

(65) Prior Publication Data

US 2013/0270817 A1 Oct. 17, 2013

Related U.S. Application Data

(60) Provisional application No. 61/624,768, filed on Apr. 16, 2012.

(51) Int. Cl.
| | |
|---|---|
| *F16L 47/03* | (2006.01) |
| *F16L 5/02* | (2006.01) |
| *F16L 47/28* | (2006.01) |
| *F16L 5/06* | (2006.01) |

(52) U.S. Cl.
CPC . *F16L 47/03* (2013.01); *F16L 5/02* (2013.01); *F16L 5/06* (2013.01); *F16L 47/28* (2013.01)

(58) Field of Classification Search
CPC ............. F16L 47/03; F16L 47/28; F16L 5/02; F16L 5/06
USPC ................................. 285/21.1, 21.2, 21.3, 22
See application file for complete search history.

(56) References Cited

U.S. PATENT DOCUMENTS

| | | | |
|---|---|---|---|
| 6,089,615 A | 7/2000 | Jappinen | |
| 6,394,502 B1* | 5/2002 | Andersson | .................... 285/21.2 |
| 6,886,388 B1* | 5/2005 | McGill et al. | .............. 73/40.5 R |
| 7,207,601 B2* | 4/2007 | Baharav | ....................... 285/21.2 |
| 7,523,962 B2 | 4/2009 | Wright et al. | |
| 2004/0160055 A1* | 8/2004 | Newton | ....................... 285/21.1 |
| 2004/0189004 A1 | 9/2004 | Wright et al. | |
| 2005/0029802 A1 | 2/2005 | Boudry et al. | |
| 2005/0062283 A1 | 3/2005 | Hawkinson et al. | |
| 2010/0207382 A1* | 8/2010 | Christodoulou et al. | .. 285/288.5 |
| 2013/0025107 A1* | 1/2013 | Higgins et al. | .................. 29/428 |

* cited by examiner

*Primary Examiner* — James Hewitt  
(74) *Attorney, Agent, or Firm* — Lucas & Mercanti, LLP.

(57) ABSTRACT

A penetration fitting unit for seal-connection between a wall and a pipe passing through a wall opening. The unit has a cylindrical sleeve having inlet and outlet ends which internally define a tubular passage. Between the inlet and outlet ends there is at least one limit stop element protruding outwardly from the outer surface of the cylindrical sleeve having a locking ring that can be coupled with the cylindrical sleeve at the outlet end thereby forming a seat for the wall. A heat transfer apparatus is interposed between the limit stop element and the sleeve outlet end. The heat transfer apparatus is placed at a portion of the cylindrical sleeve's outer surface and has a first area at least partially overlapping with respect to the seat for the wall and a second area overlapping with a portion of internal surface of the locking ring.

8 Claims, 5 Drawing Sheets

PENETRATION FITTING UNIT FOR SEAL-CONNECTION BETWEEN A WALL AND A PIPE PASSING THROUGH

CROSS-REFERENCE TO RELATED APPLICATION

This Application claims the benefit of priority from U.S. Provisional Patent Application No. 61/624,768, filed Apr. 16, 2012, the contents of which are incorporated herein by reference.

FIELD OF THE INVENTION

The present invention refers to a penetration fitting unit for seal-connection between a wall and a pipe passing through an opening provided therein.

BACKGROUND OF THE INVENTION

In particular, the present invention has application for making a seal connection between a wall of an inspection pit and a pipe intersecting it, wherein the wall of the pit passed through by the pipe is generally made from thermoweldable material, like for example plastic material and, more specifically, polyethylene.

As an example, the present invention is advantageously applicable as a penetration fitting for inspection pits of underground tanks, pits of collectors for geothermal probes, inspection pits of electric cables and/or telecommunication cables and so on, which are all characterised by the possibility of forming or by the presence, in at least one wall, of an opening for the passage of a pipe.

In such pits it is essential to make a water-tight connection between the opening and the pipe passing through in order to avoid infiltrations of liquids inside the pit.

For this purpose it is known to use special rubber coatings fixed through jubilee clips or, alternatively, mechanical fastening means equipped with rubber gaskets that are interposed between the fitting and the wall of the pit.

Such solutions do, however, have the drawback of a limited reliability over time, since rubber gaskets are subject to a lot of wear.

Moreover, it is known to make fittings provided with an annular flange with radial extension with respect to the axis of the fitting and towards the outside of the fitting, for positioning in abutment on the wall of the pit and the subsequent connection to it.

Penetration fitting provided with an annular flange differ from one another in the method of connection thereof to the wall of the pit, with it being able to be carried out through ultrasound welding, thermowelding, gluing or another type of connection through chemical agents.

Specifically, such fittings, at the annular flange, make an annular connection with the wall of the pit placed around the through opening for the pipe made in the wall of the pit, in this way insulating the opening in a sealed manner.

All of the solutions that make use of an annular flange for the creation of an annular connection concentric to the opening are not without drawbacks.

Firstly, in order to make an annular connection, the flange must have a relevant radial extension that allows to house the means for making the connection, such as an electric resistance in the case of connection through thermowelding.

It is therefore necessary to have a substantial support surface, which limits the possibilities of arranging the fitting on the wall of the pit.

In addition, even small imperfections in the abutment of the wall of the pit with the flange lead to making a weakened annular connection and, consequently, not very suitable for counteracting the fatigue stresses to which it is exposed.

All of this leads to low reliability over time of the connections made through known flange-type penetration fittings.

In order to reduce this drawback, while flange-type penetration fittings are applied it is necessary to preliminarily treat the portion of wall of the pit against which the flange will rest through the use of special manual processing tools and possibly of suitable chemical agents.

This makes the application of known penetration fittings particularly laborious and it takes a lot of man-hours.

SUMMARY OF THE INVENTION

An object of the present invention is to avoid the aforementioned drawbacks and in particular to devise a penetration fitting unit for seal-connection between a wall and a pipe passing through that is able to make a connection that is reliable over time without the need for prior treatment of the wall.

Another object of the present invention is to provide a penetration fitting unit for seal-connection between a wall and a pipe passing through that has low bulk, offering greater flexibility in the choice of location of the passage of the pipe in the pit.

A further object of the present invention is to make a penetration fitting unit for seal-connection between a wall and a pipe passing through that can be installed in a simple manner, taking a small amount of time.

These and other objects according to the present invention are accomplished by making a penetration fitting unit for seal-connection between a wall and a pipe passing through an opening provided in the wall. The unit includes a cylindrical sleeve internally defining a tubular passage. The cylindrical sleeve has an inlet end and an outlet end, and between the inlet end and the outlet end there is at least one limit stop element protruding outwardly from the outer surface of the cylindrical sleeve. The limit stop element has a locking ring that can be axially coupled with the cylindrical sleeve at the outlet end so as to form a seat for the wall. A heat transfer means is interposed between the limit stop element and the outlet end. The heat transfer means is substantially placed at a portion of the outer surface of the cylindrical sleeve and has at least a first area at least partially overlapping with respect to the seat for the wall and at least a second area overlapping with a portion of the internal surface of the locking ring.

Further characteristics of the penetration fitting unit for seal-connection between a wall and a pipe passing through are described in the dependent claims.

BRIEF DESCRIPTION OF THE DRAWINGS

The characteristics and advantages of a penetration fitting unit for seal-connection between a wall and a pipe passing through according to the present invention will become clearer from the following description, given as an example and not for limiting purposes, referring to the attached schematic drawings, in which:

FIG. 2b is an enlarged detail of FIG. 2a;

FIG. 3 is an exploded perspective view of the embodiment illustrated in FIG. 2a;

DETAILED DESCRIPTION OF THE INVENTION

Figure 1:
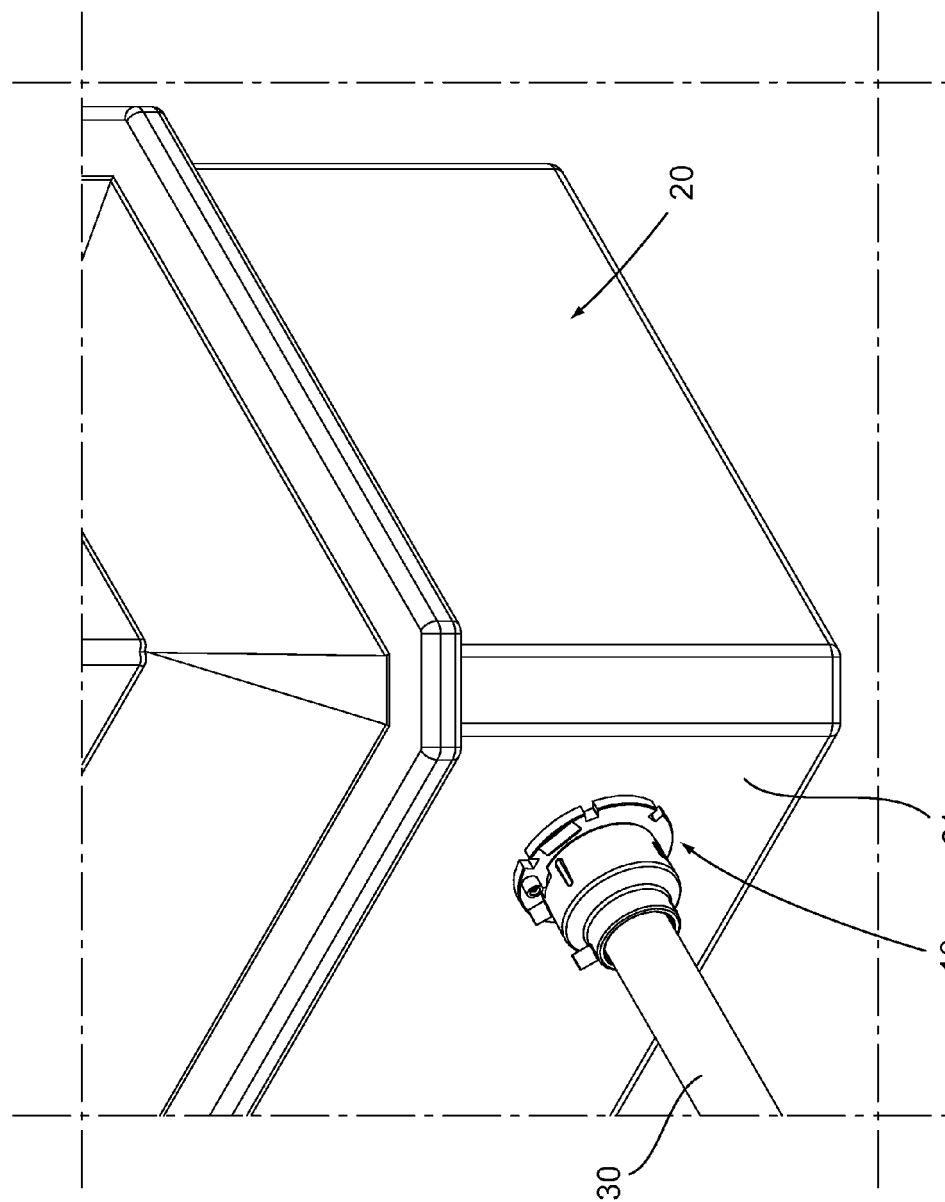
FIG. 1 is a partial view of a penetration fitting unit for seal-connection between a wall and a pipe passing through according to the present invention applied to the wall of a watertight chamber.
Figure 2B:
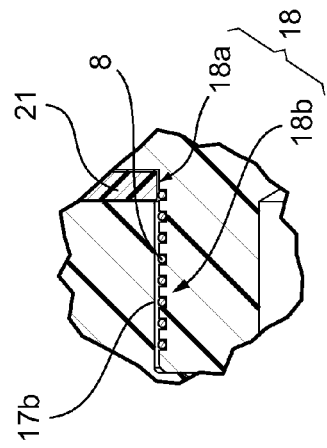
Figure 2A:
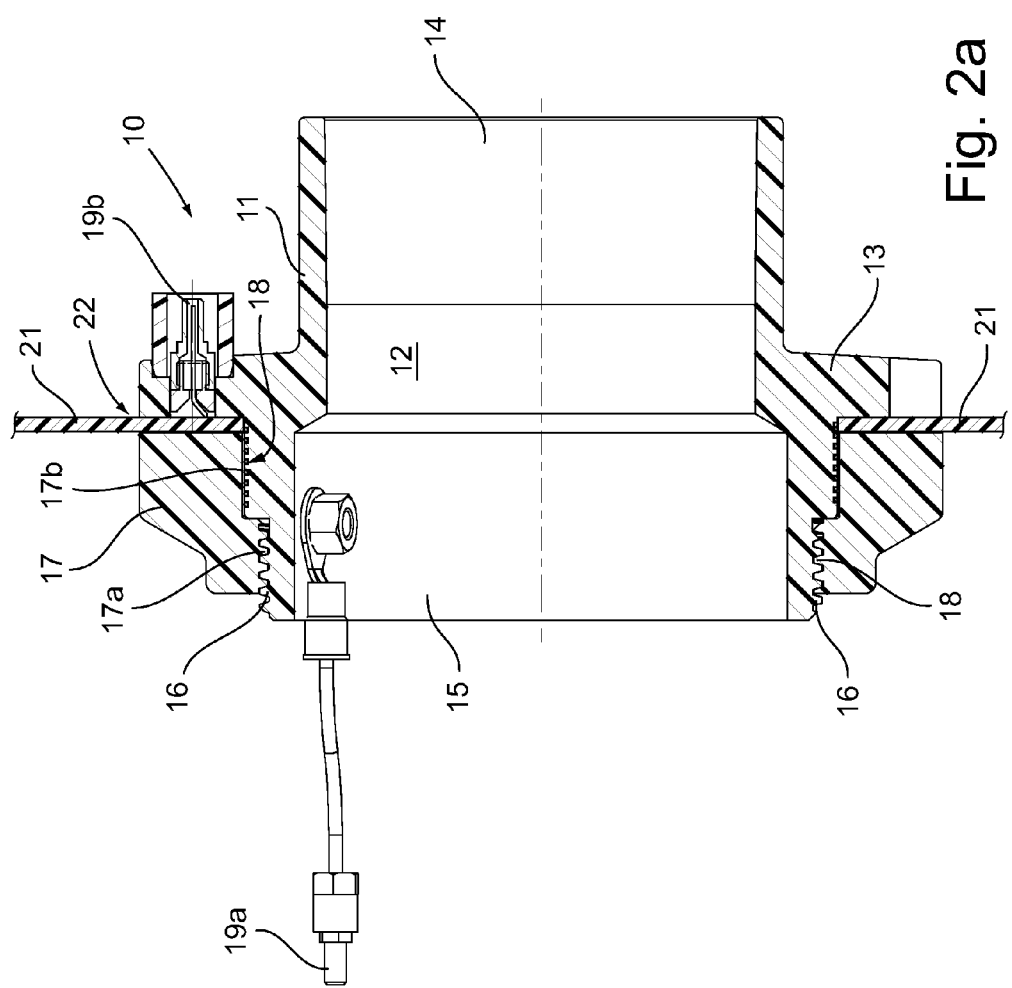
FIG. 2a is a section view of a first preferred embodiment of the penetration fitting unit for seal-connection between a wall and a pipe passing through according to the present invention.
Figure 3:
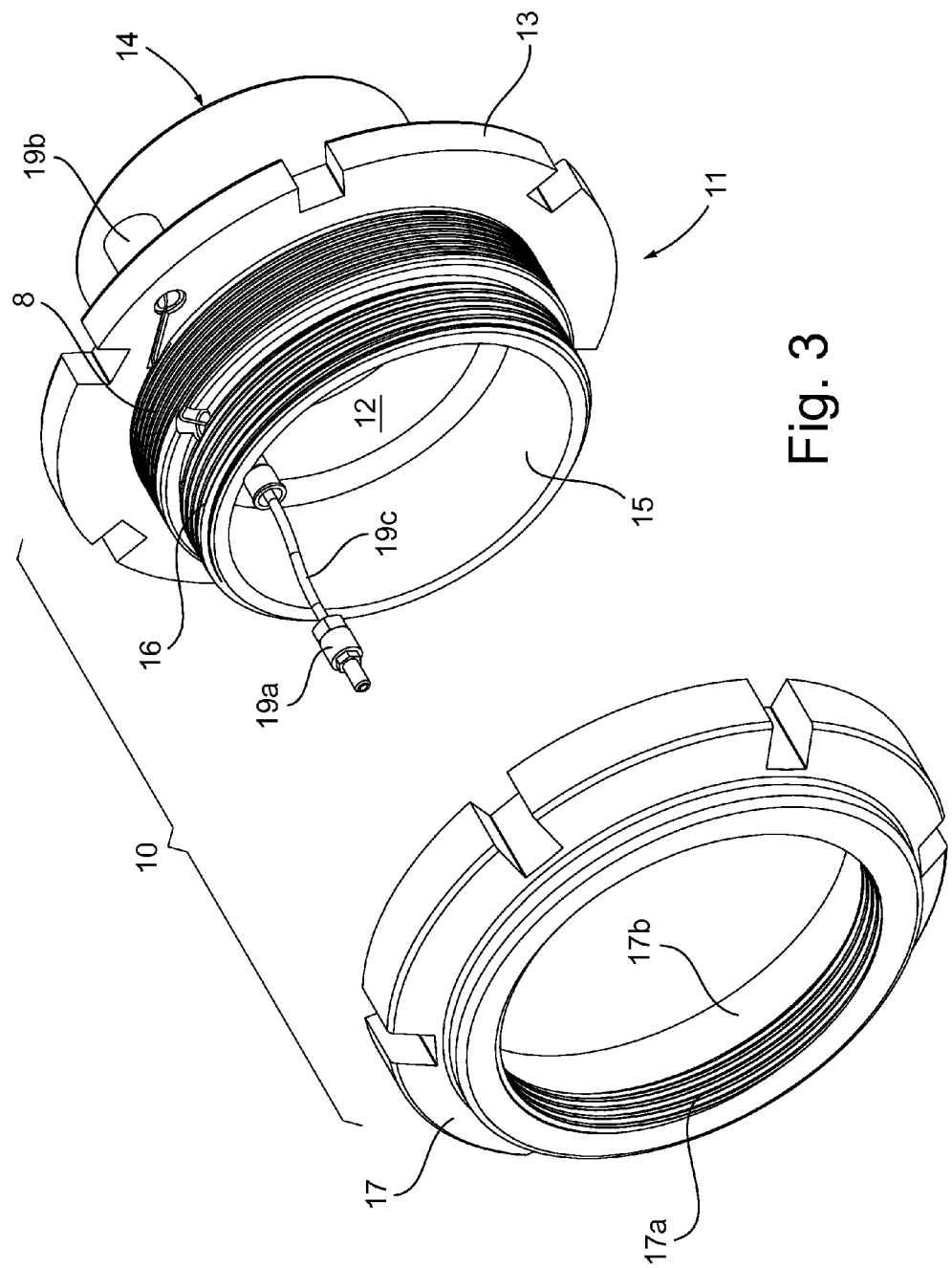

With reference to the figures, a penetration fitting unit for seal-connection between a wall and a pipe passing through is shown, wholly indicated with 10.

In particular, the penetration fitting unit 10 according to the present invention is suitable for the sealed connection between a wall 21 of a watertight chamber 20, like for example an underground inspection pit, and a pipe 30 passing through such a wall 21, wherein at least one portion of the wall 21 is made from thermoweldable material, such as plastic material, like for example polyethylene, and wherein by pipe it is meant a tube of any type and section, like for example a smooth tube, a corrugated tube or other types of tube.

In order to allow the passage of the pipe 30 through the wall 21 it is necessary to provide an opening (not illustrated) in the wall 21.

The opening is provided at one portion of the wall 21 made from thermoweldable material.

The penetration fitting unit 10 according to the present invention is used to sealably connect the pipe 30 to the wall 21 in order to prevent there being infiltrations of liquids inside the watertight chamber 20, through the opening applied in the wall 21 itself.

The penetration fitting unit 10 comprises a cylindrical sleeve 11 that internally defines a tubular passage 12 for the passage of the pipe 30 towards the inside of the watertight chamber 20.

The cylindrical sleeve 11 comprises a first inlet end 14 of the pipe 30 and a second outlet end 15 of the pipe 30.

In an alternative embodiment that is not illustrated, the cylindrical sleeve 11 is connected at the inlet end 14 to a terminal end of the pipe 30 and projects to the outlet end 15 to form a section of pipe passing inside the watertight chamber 20.

Between the inlet end 14 and the outlet end 15 there is at least one limit stop element 13 arranged on the outer surface of the cylindrical sleeve 11 and projecting outwards.

The limit stop element 13, going into abutment with the wall 21, defines the axial locking position of the sleeve 11 with respect to the wall 21.

In the illustrated embodiments, the limit stop element 13 is made in the shape of an annular protrusion extending radially from the outer surface of the sleeve 11 outwards.

In alternative embodiments that are not illustrated, the limit stop element 13 is made from at least one pair of teeth protruding radially and outwardly from the outer surface of the sleeve 11.

In order to make the limit stop function, it is sufficient for the limit stop element 13 to have a minimal extension in the radial direction, in this way allowing the wall surface 21 occupied to be kept low for a correct installation of the penetration fitting unit 10.

According to the present invention, the penetration fitting unit 10 comprises a locking ring 17 that can be axially coupled with the cylindrical sleeve 11 at the outlet end 15 so as to form a seat 22 for the wall 21.

For this purpose, on the outer surface of the sleeve 11, at the outlet end 15 of the same 11, there is at least one portion 16 axially coupling with the locking ring 17.

In the illustrated embodiments, the cylindrical sleeve 11 and the locking ring 17 can be removably fixed together, the axial coupling portion 16 being of the removable mechanical coupling type.

For this purpose, the coupling portion 16 comprises a threading and the locking ring 17 internally comprises a counter-threading placed at a first portion 17a of the internal surface of the locking ring 17 suitable for overlapping with the axial coupling portion 16 of the cylindrical sleeve 11.

In an alternative embodiment that has not been illustrated, the cylindrical sleeve 11 and the locking ring 17 can be non-removably fixed together, the axial coupling portion 16 being of the non-removable mechanical coupling type.

For this purpose, the coupling portion 16 and the first portion 17a of the internal surface of the locking ring 17 are for example shaped in a matching manner, such as to make a snap coupling.

Alternatively, the coupling portion 16 and the first portion 17a of the internal surface of the locking ring 17 are shaped so as to make a fixed or bayonet coupling.

In alternative embodiments that have not been illustrated, the axial coupling is carried out through an external stop element suitable for keeping the locking ring 17 up against the axial coupling portion 16 of the sleeve 11.

Between the limit stop element 13 and the outlet end 15 heat transfer means 8 are interposed, arranged substantially at a portion 18 of the outer surface of the cylindrical sleeve 11 comprising at least one first area 18a at least partially overlapping with respect to the seat 22 for the wall 21 and at least one second area 18b overlapping with a second portion 17b of the internal surface of the locking ring 17.

In particular, the heat transfer means 8 are placed in an area comprised between the axial coupling portion 16 and the limit stop element 13, thus not overlapping with the axial coupling portion 16.

The heat transfer means 8 are preferably buried in the thickness of the cylindrical sleeve 11, possibly being able to be accessed from the outer surface of the same 11.

At least the portion of surface of the sleeve 11 along which the heat transfer means 8 are arranged is made from thermoweldable material, such as plastic material, like for example polyethylene.

Correspondingly, at least the second portion 17b of the internal surface of the locking ring 17 is also made from thermoweldable material, such as plastic material, like for example polyethylene.

The heat transfer means 8 are preferably an electric wire spirally wound around the cylindrical sleeve 11 and housed in suitable seats made at the outer surface of the sleeve 11.

The electric wire 8 terminates in two electric contacts 19a, 19b accessible from the outside for the purpose of application of electrical energy.

Once the sleeve 11 is positioned in the opening made in the wall 21 of the watertight chamber 20 with the limit stop element 13 in abutment on the wall 21 and the locking ring 17 has been axially fixed to the sleeve 11, the electric contacts 19a, 19b are connected to an electrical energy source that makes electric current flow through the electric wire 8.

Such passage of electric current leads to the generation of heat that is transferred to the surrounding areas 18a, 18b, 17b, 21 with the heat transfer means 8.

Therefore, the fusion of such areas 18a,18b,17b,21 takes place, creating a fixed coupling, respectively, between:

the area 18a of seat of the thickness of the wall 21 and the thickness itself of the wall 21; as well as the area 18b of overlapping with the second portion 17b of the internal surface of the locking ring 17 and such a second portion 17b.

This advantageously leads to the simultaneous creation of:

a watertight seal between the sleeve 11 and the wall 21 that extends for the entire perimeter of the opening made in the wall 21; and a non-removable fastening between the sleeve 11 and the locking ring 17 that ensures the seal over time.

Preferably, in order to reduce the risks of short-circuit during the application of electrical energy, the electric wire 8 wound around the sleeve 11 terminates in two electric contacts 19a,19b accessible, respectively, from the side of the inlet end 14 and from the side of the outlet end 15 of the sleeve 11.

For this purpose and in order to allow access to both the electric contacts 19a,19b even once the sleeve 11 has been positioned in the opening of the wall 21 and it has been locked in place through the locking ring 17, the electric contact 19a placed on the side of the outlet end 15 of the sleeve 11 is prolonged through a suitable insulated electric wire 19c.

The electric contact 19b placed on the side of the inlet end 14 of the sleeve 11 is preferably accessible at the limit stop element 13.

In embodiments that are totally equivalent and have not been illustrated, the electric contact 19b placed on the side of the inlet end 14 of the sleeve 11 is accessible at the outer surface of the sleeve 11 itself.

Figure 4:
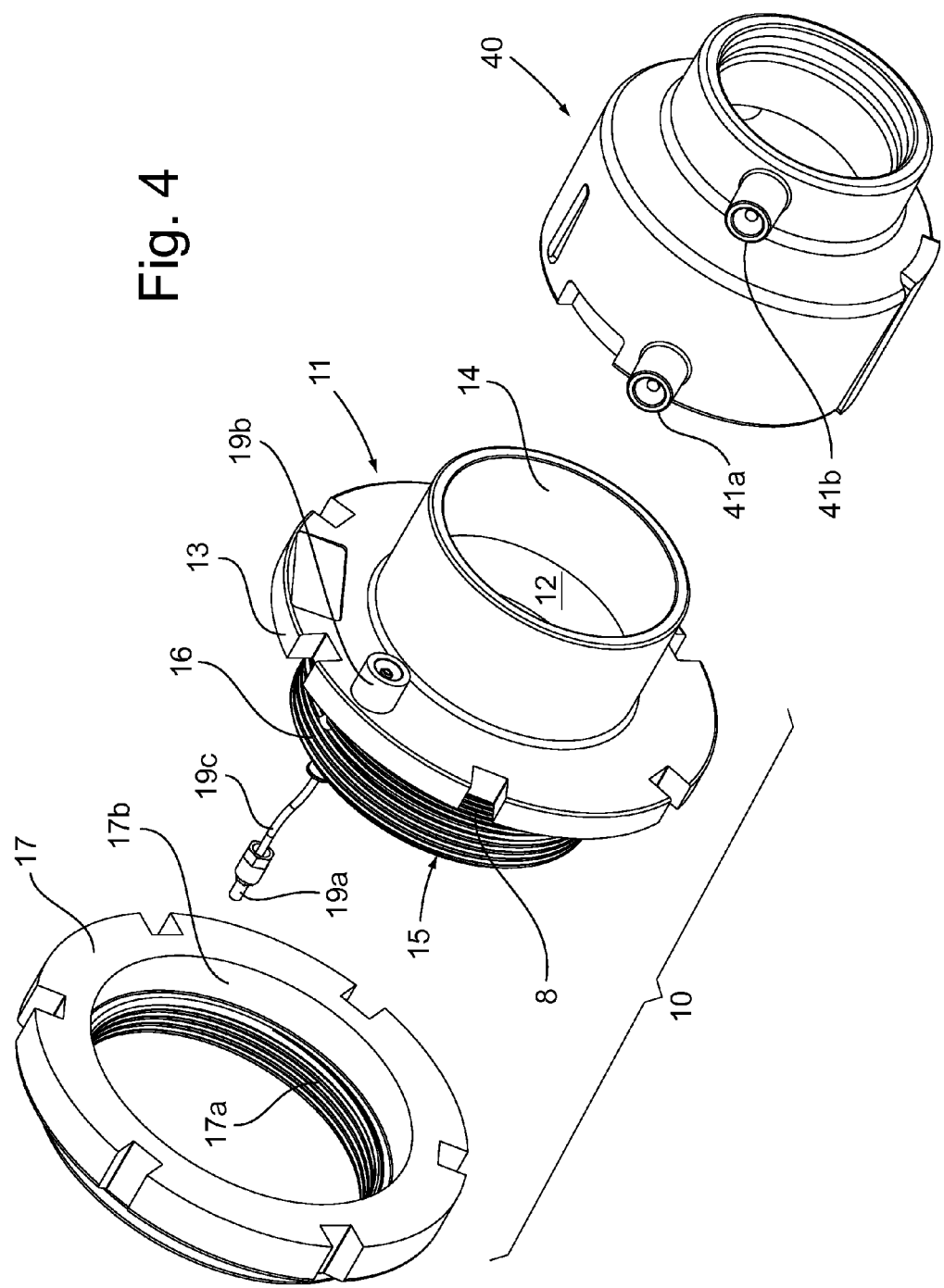
FIG. 4 is an exploded perspective view of a second preferred embodiment of the penetration fitting unit for seal-connection between a wall and a pipe passing through provided with a connection element for the water-tight connection to a pipe.
Figure 5:
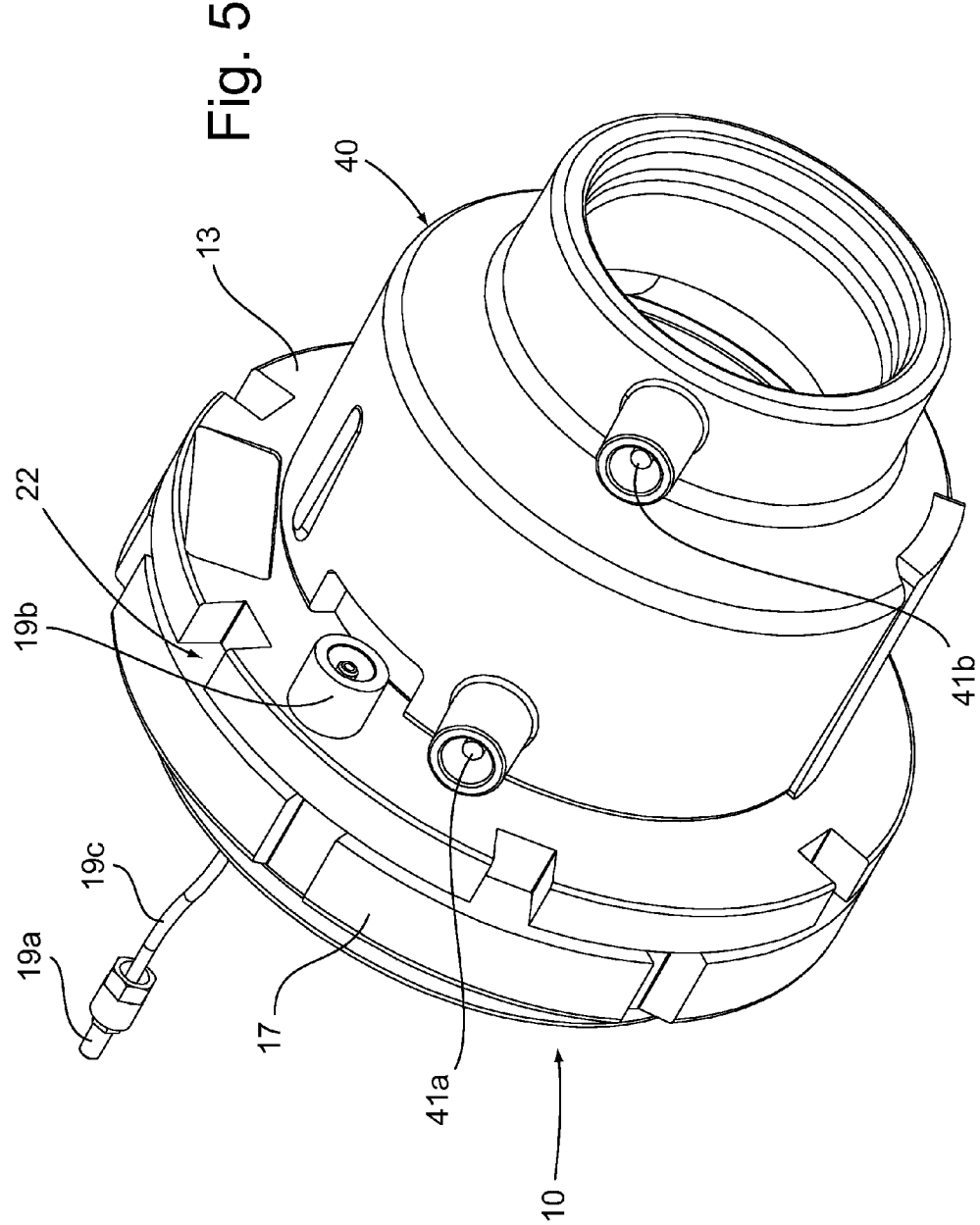
FIG. 5 is a perspective view of the embodiment of FIG. 4 in assembled configuration.

According to the preferred embodiment illustrated in FIGS. 4 and 5, the penetration fitting unit 10 preferably comprises, in addition, a connection element 40 to a pipe 30 made from thermoweldable material.

The connection element 40 to the pipe 30 preferably comprises heat transfer means (not illustrated) that terminate in electric contacts 41a,41b accessible from the outside for the connection to an electrical energy source.

Similarly to what has already been illustrated above, the connection of the electric contacts 41a,41b to an electrical energy source makes electric current flow through the heat transfer means and, consequently, makes heat transfer to the adjoining walls to such heat transfer means.

Therefore, the fusion of such walls takes place, creating a fixed coupling between the connection element 40 and, respectively, the pipe 30 and the first inlet end 14 of the cylindrical sleeve 11.

In an alternative embodiment that has not been illustrated, the first inlet end 14 of the cylindrical sleeve 11 is shaped so as to receive a rubber coating for the watertight coupling with the pipe 30.

From the description that has been made the characteristics of the penetration fitting unit object of the present invention are clear, just as the relative advantages are also clear.

Indeed, thanks to the fact that, according to the present invention, the connection by thermowelding takes place mainly between surfaces of the penetration fitting unit itself and only to a small extent with the wall of the watertight chamber, in order to seal tight the opening made in the wall it is not necessary to carry out prior treatments of the internal or external surface of the wall. In this way there is a saving of man-hours, also making the use of special machine tools unnecessary.

Moreover, the penetration fitting unit according to the present invention has a low bulk, making it possible to flexibly choose where to make the opening in the wall for the inlet of the pipe into the watertight chamber.

Last but not least, the penetration fitting unit according to the present invention is not only able to sealably insulate the opening of the wall, but also to make a highly reliable fastening thanks to the thermowelding between the sleeve and the locking ring.

The penetration fitting unit according to the present invention is therefore characterised by a longer lifetime, still ensuring high reliability of seal.

Finally, it is clear that the penetration fitting unit thus conceived can undergo numerous modifications and variants, all of which are covered by the invention; moreover, all of the details can be replaced by technically equivalent elements. In practice, the materials used, as well as the sizes, can be whatever according to the technical requirements.

The invention claimed is:

1. A penetration fitting unit for seal-connection between a wall and a pipe passing through an opening provided in said wall, comprising:

a cylindrical sleeve internally defining a tubular passage, said cylindrical sleeve having an inlet end and an outlet end, between said inlet end and said outlet end there being at least one limit stop element protruding outwardly from the outer surface of said cylindrical sleeve, a locking ring that can be axially coupled with said cylindrical sleeve at said outlet end so as to form a seat for said wall whereby said wall upon insertion into said seat is in an abutting relationship with said locking ring and said cylindrical sleeve, a heat transfer means being interposed on said cylindrical sleeve between said limit stop element and said outlet end to allow thermowelding of said wall and said locking ring to said cylindrical sleeve without thermowelding a planar surface of said wall to said locking ring or to said limit stop element, said heat transfer means being interposed proximal to said outer surface of said cylindrical sleeve at a position extending from at least a first area at least partially overlapping the bottom of said seat for said wall and at least a second area overlapping the internal surface of said locking ring, wherein at said outlet end, said outer surface of said cylindrical sleeve is provided with a axial coupling portion for coupling with said locking ring, said heat transfer means being situated in an area between said axial coupling portion and said limit stop element to avoid said heat transfer means overlapping of said axial coupling position and thermowelding of said axial coupling portion to said locking ring, wherein said axial coupling portion has a threading and said locking ring internally has a counter-threading placed at a portion of the internal surface of said locking ring for engaging said threading of said axial coupling portion of said cylindrical sleeve, and wherein said heat transfer means is an electric wire spirally wound around said cylindrical sleeve and housed in a suitable spiral seat situated at said outer surface of said cylindrical sleeve.

2. The penetration fitting unit according to claim 1, wherein said limit stop element is shaped as an annular protrusion extending radially and outwardly from said outer surface of said cylindrical sleeve.

3. The penetration fitting unit according to claim 1, wherein said limit stop element consists of a pair of teeth protruding radially and outwardly from said outer surface of said cylindrical sleeve.

4. The penetration fitting unit according to claim 1, wherein, prior to thermowelding, said cylindrical sleeve and said locking ring are detachable after coupling.

5. The penetration fitting unit according to claim 1, wherein, prior to thermowelding, said cylindrical sleeve and said locking ring are non-detachable after coupling.

6. The penetration fitting unit according to claim 1, wherein said electric wire terminates in two electric contacts accessible from the outside from the side of said inlet end and from the side of said outlet end of said cylindrical sleeve, respectively.

7. The penetration fitting unit according to claim 6, wherein said electric contact that terminates on the side of said outlet end, is prolonged by means of an insulated electric wire.

8. The penetration fitting unit according to claim 1, wherein at said inlet end of said cylindrical sleeve, said penetration fitting unit has a connection element to said pipe comprising heat transfer means terminating in electric contacts accessible from the outside.

\* \* \* \* \*